US009189077B2

(12) United States Patent
Mori et al.

(10) Patent No.: US 9,189,077 B2
(45) Date of Patent: Nov. 17, 2015

(54) USER CHARACTER INPUT INTERFACE WITH MODIFIER SUPPORT

(75) Inventors: Yasuhiko Mori, Tokyo (JP); Shinji Morimitsu, Tokyo (JP); Kazuhide Oigo, Kanagawa (JP); Takeshi Tanaka, Tokyo (JP); Eric Matthew Bell, Seattle, WA (US); Liang Chen, Bellevue, WA (US); Juan Dai, Redmond, WA (US); William Arthur Steward Buxton, Toronto (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 57 days.

(21) Appl. No.: 13/294,879

(22) Filed: Nov. 11, 2011

(65) Prior Publication Data

US 2012/0302291 A1    Nov. 29, 2012

Related U.S. Application Data

(60) Provisional application No. 61/489,650, filed on May 24, 2011.

(51) Int. Cl.
*H04M 1/00* (2006.01)
*G06F 3/01* (2006.01)
*G06F 3/0488* (2013.01)

(52) U.S. Cl.
CPC ............ *G06F 3/018* (2013.01); *G06F 3/04883* (2013.01)

(58) Field of Classification Search
CPC ............. H04M 1/72522; G06F 3/0236; H04L 65/4015
USPC .......... 455/418, 456.6, 39, 412.1, 575.3, 466, 455/566, 550.1, 344; 345/174, 172, 158, 345/168, 173, 473; 715/863, 702, 773
See application file for complete search history.

(56) References Cited

U.S. PATENT DOCUMENTS

| 7,752,555 | B2 | 7/2010 | Sutanto et al. |
| 7,761,814 | B2 | 7/2010 | Rimas-Ribikauskas et al. |
| 2004/0169674 | A1 | 9/2004 | Linjama |
| 2007/0262964 | A1 | 11/2007 | Zotov et al. |

(Continued)

OTHER PUBLICATIONS

Malacria, Sylvain, Eric Lecolinet and Yves Guiard. "Clutch-Free Panning and Integrated Pan-Zoom Control on Tough-Sensitive Surfaces: The CycloStar Approach." Proceedings of the 2010 Conference on Human Factors in Computing Systems (CHI 2010: No Touch), Apr. 10-15, 2010, Atlanta, GA, USA. 10 pages.

*Primary Examiner* — Kiet Doan
(74) *Attorney, Agent, or Firm* — Jim Banowsky; Kate Drakos; Micky Minhas

(57) ABSTRACT

A user interface suited for use on mobile devices for entering characters which may require one or more modifiers is disclosed. The interface may be implemented utilizing a touch screen interface on which a user engages the interface, is provided feedback, and removes the user's touch to enter a character. The interface presents a series of main, supplemental and modifier keys. Touching an interface button or main key presents a series of "petals" or supplemental keys emanating from the main key. Each petal or supplemental key may in turn present one or more sub petals or modifier keys emanating from the supplemental key. Each petal or sub-petal may represent another character or a modifier action. The characters and/or actions on the supplemental keys and modifier keys provide options for characters or modifiers which are dependent or related to the main input key.

20 Claims, 18 Drawing Sheets

(56) References Cited

U.S. PATENT DOCUMENTS

| | | | |
|---|---|---|---|
| 2008/0108344 A1* | 5/2008 | Kuwabara et al. | 455/418 |
| 2009/0243897 A1* | 10/2009 | Davidson et al. | 341/22 |
| 2009/0265669 A1 | 10/2009 | Kida et al. | |
| 2010/0333011 A1* | 12/2010 | Kornev et al. | 715/773 |
| 2011/0055697 A1* | 3/2011 | Davidson et al. | 715/702 |
| 2011/0057903 A1* | 3/2011 | Yamano et al. | 345/174 |

* cited by examiner

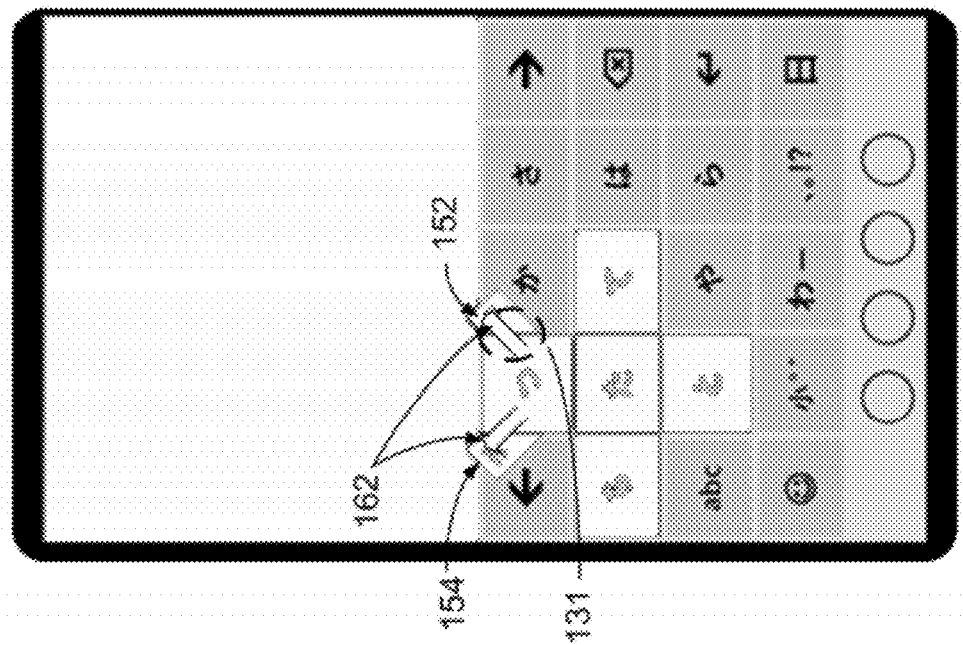
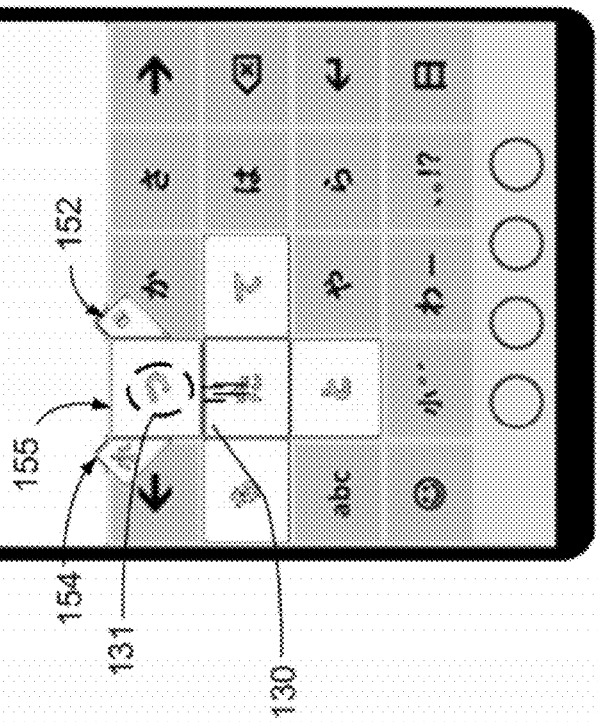

Figure 2
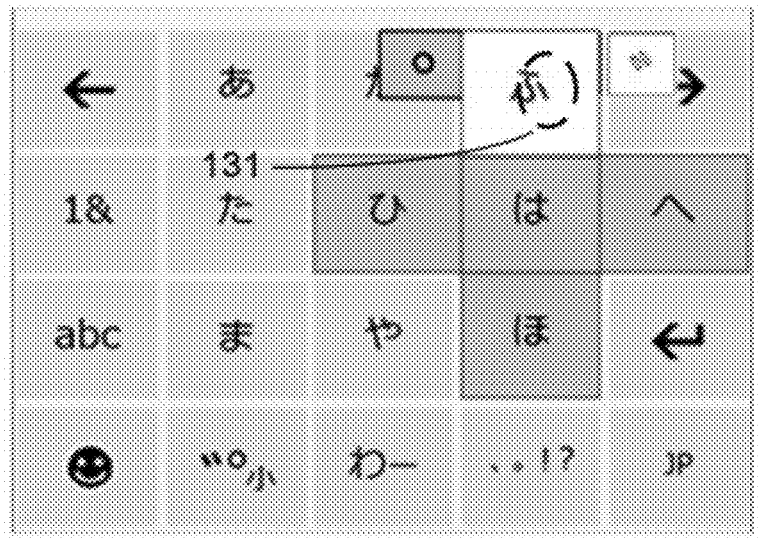
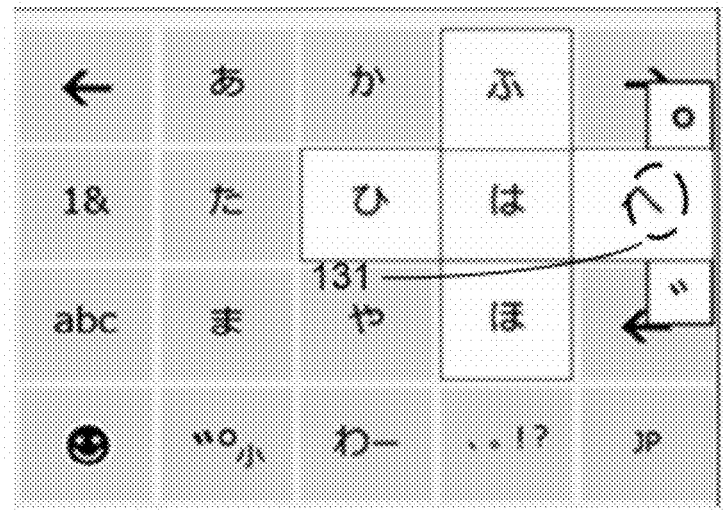
Figure 3

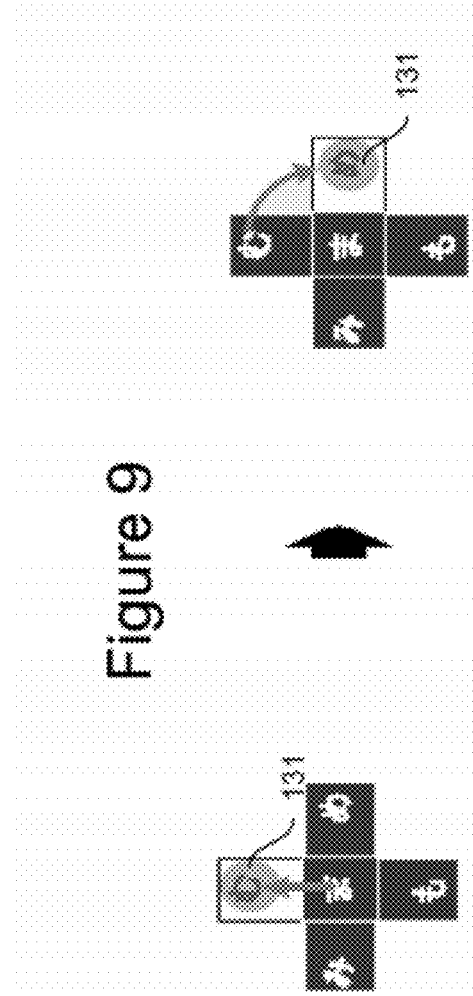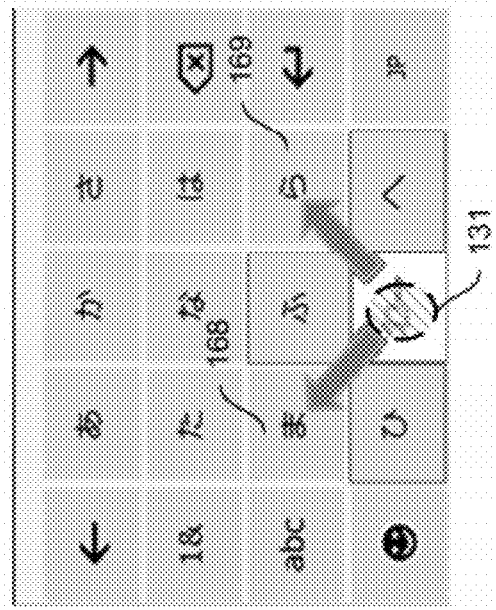

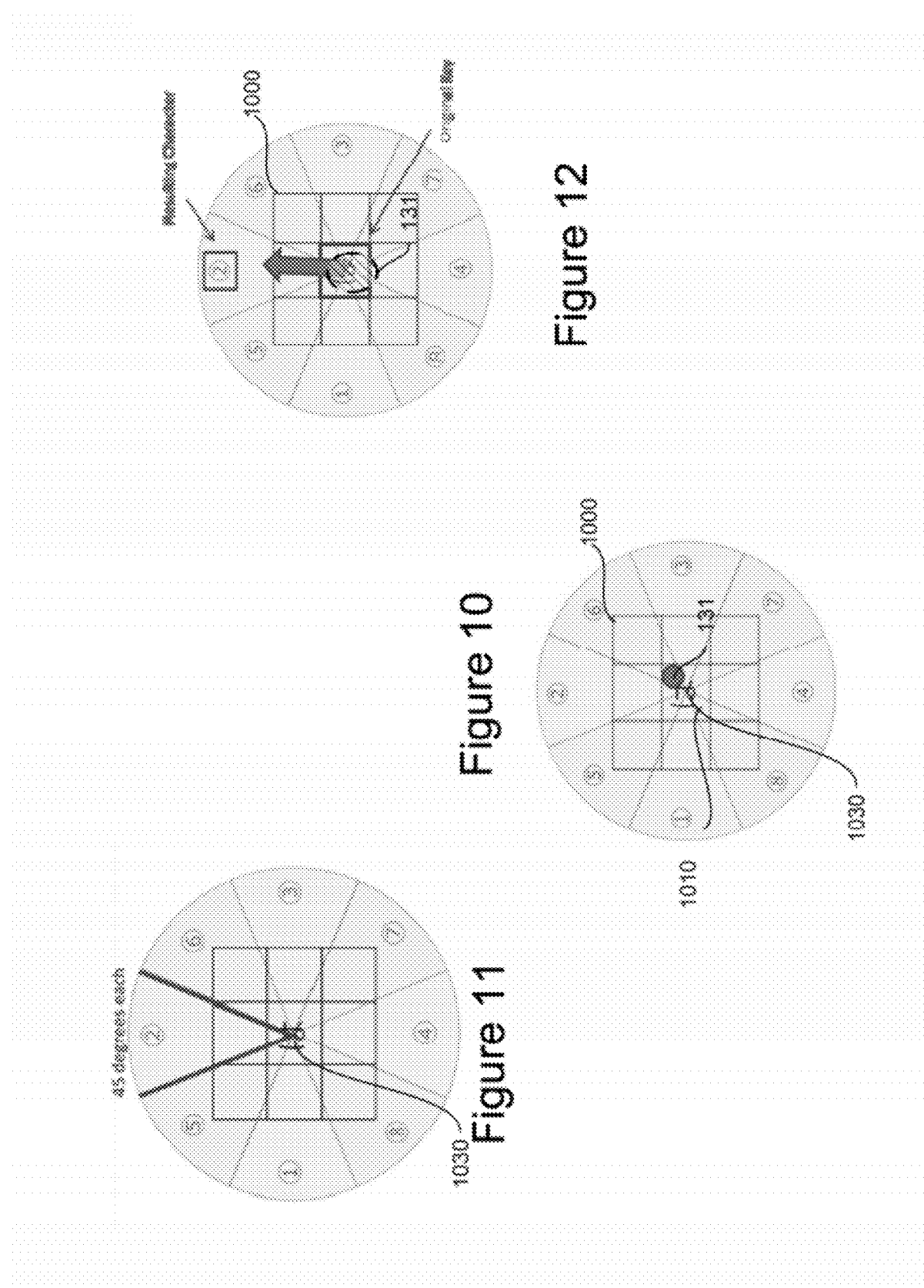

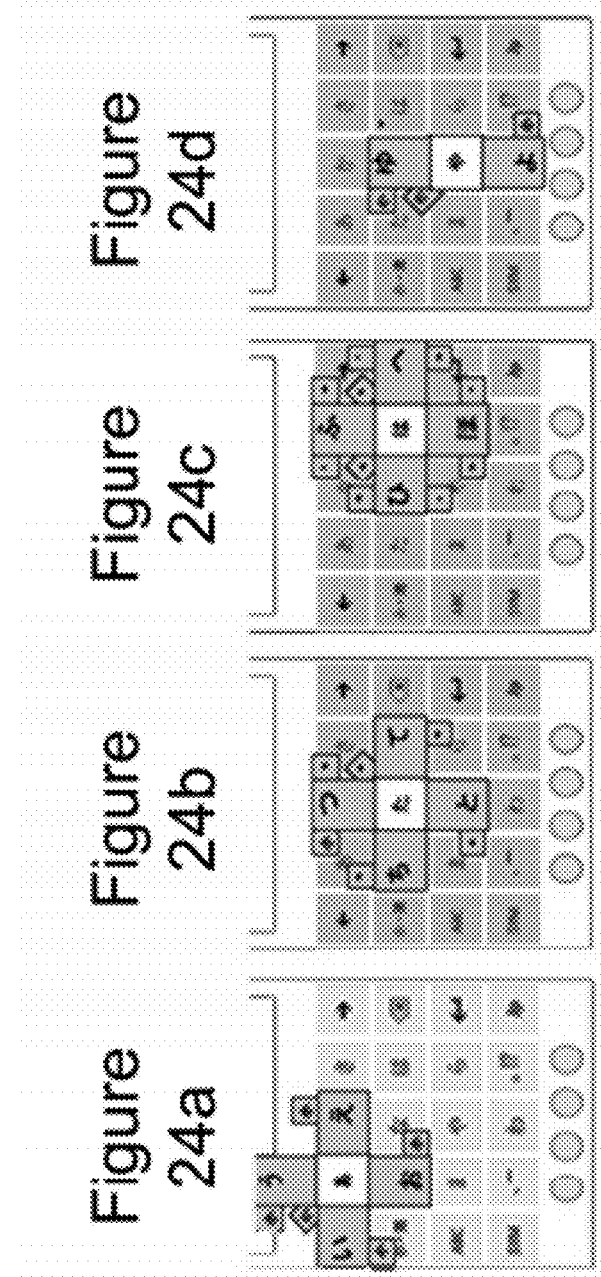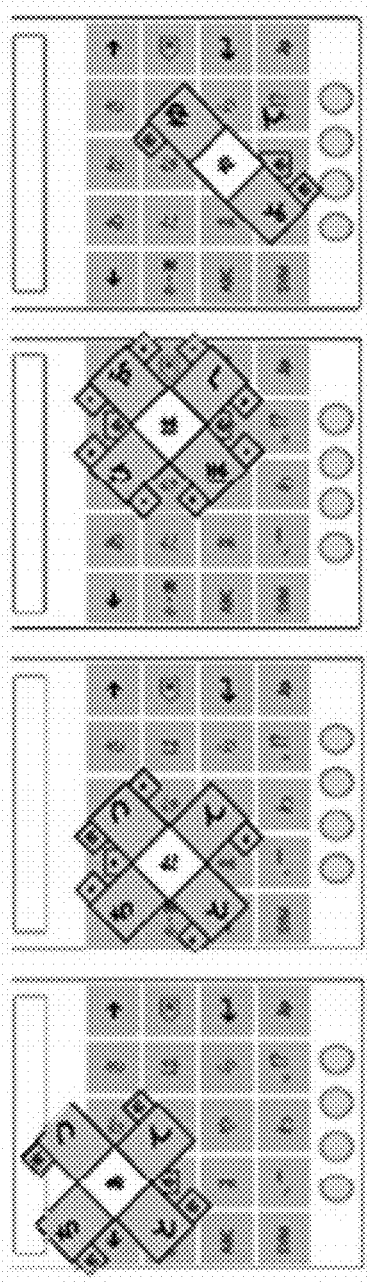

USER CHARACTER INPUT INTERFACE WITH MODIFIER SUPPORT

CLAIM OF PRIORITY

The present application claims priority to U.S. Provisional Patent Application No. 61/489,650, entitled "Modifier Support For Flick And Flower," filed May 24, 2011, which application is incorporated by reference herein in its entirety.

BACKGROUND

The Japanese language is written with a combination of Chinese characters called kanji and modified Chinese characters called hiragana and katakana. The system used to input Japanese on mobile phones is based on the numerical keypad. Each number is associated with a particular sequence of kana and, in one embodiment, a button is pressed repeatedly to get the correct kana, while the number of presses determines the row. Marks, punctuation, and other symbols can be added by other buttons in the same way. Kana to kanji conversion is done via other keys After the kana have been input, they are either left as they are, or converted into kanji (Chinese characters). Various techniques have been implemented by mobile phone developers to enable Japanese language input on mobile phones. In touch sensitive phones, Japanese language keyboards provide 12 keys of kanji characters, the selection of one character of which highlights the character as well as four alternatives to the main character which a user can select by sliding their finger from the selected main character to the alternative character. A sub-menu is then presented in the text entry area with additional options.

SUMMARY

Technology is presented which provides a user interface suitable for entering characters, such as those used in the Japanese written language, in a mobile device. The interface includes displaying character key inputs on an input surface and associating at least one character with the character key input. A supplemental key area is associated with one or more of the character key inputs, each supplemental key area representing one of a character modifier or a supplemental character related to the character represented by the character key input. A modifier key area is associated with one or more of supplemental key areas and represents a character modifier for a supplemental character. Upon receiving a selection of a main key area, supplemental key areas are displayed and upon receiving selection of supplemental keys, modifier keys are displayed. Entry of the main, supplemental or modifier key is provided when a user removes their finger from contact with the interface. The interface is tuned to recognize gestures made by users.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 1A through 1D illustrate various embodiments of a character input interface in accordance with the present technology.

FIGS. 2 through 5 illustrate character input interfaces in accordance with the present technology.

FIG. 8 illustrates movement alternatives for a user engaging the user interface.

FIG. 9 illustrates movement of a user's finger from one key to an alternative key.

FIG. 10 is a chart illustrating the movement segments relative to a user touch engaged with the user interface.

FIG. 11 illustrates the manner in which movement segments are determined in the present user interface.

FIG. 12 illustrates movement of a user with respect to the segments shown in FIGS. 10 and 11.

FIG. 24A through 24H illustrates alternative embodiments of the presentation of various keys in accordance with the present technology.

DETAILED DESCRIPTION

Technology is presented to provide a user interface particularly suited for use on mobile devices for entering characters which may require one or more modifiers. The technology may be implemented utilizing a touch screen interface on which a user engages the interface, is provided feedback, and removes the user's touch to enter a character. In one embodiment, touching an interface button or main key presents a series of "petals" or supplemental keys emanating from the main key. Each petal or supplemental key may in turn present one or more sub petals or modifier keys emanating from the supplemental key. Each petal or sub-petal may represent another character or a modifier action. The characters and/or actions on the supplemental keys and modifier keys provide options for characters or modifiers which are dependent or related to the main input key. Each main input key may have one or more petals or sub-petals which emanate therefrom.

Figure 1A:
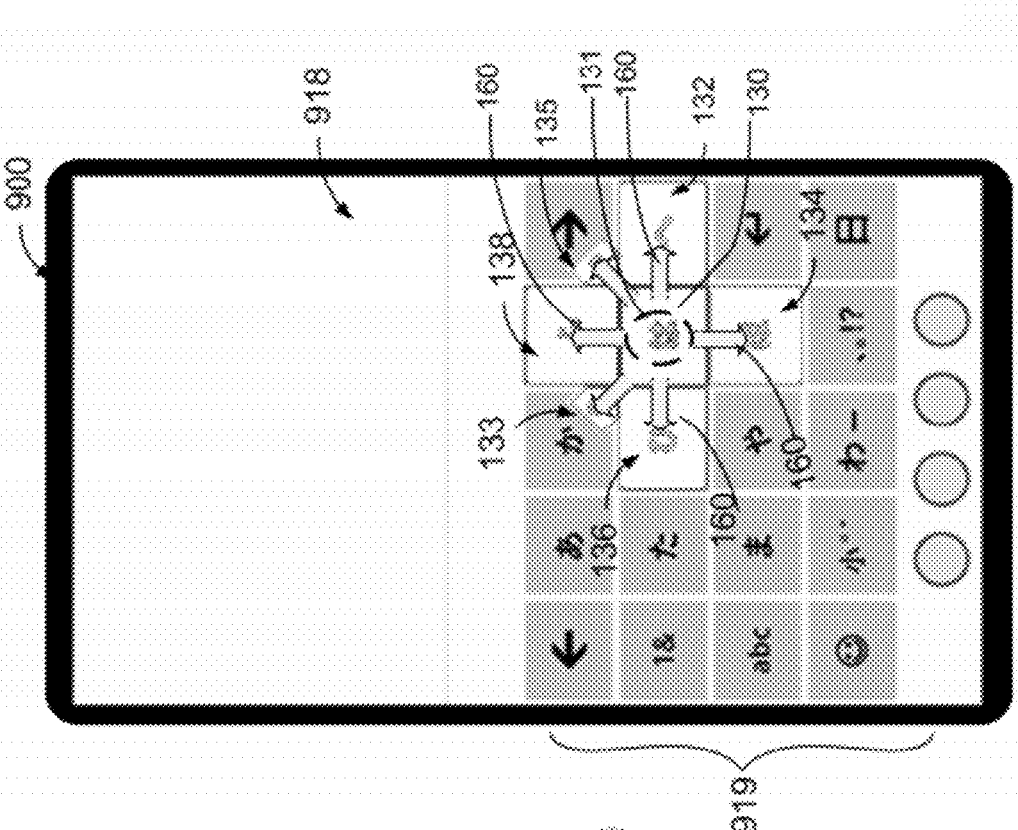

A first embodiment of the user interface of the present technology is shown in FIGS. 1A through 1D. FIG. 1A illustrates a mobile device 900 having a touch screen interface 919 which may be subdivided into a text input portion 918 and a text display portion 917. It should be understood that the position of the text input portion and the text display portion are merely exemplary and such portions may exist of a number of different configurations on the input screen.

The text input portion 918 may be presented as a series of keys provided in rows 110, 112, 114, 116, and columns 101 through 105. In FIG. 1A, a total of 20 input keys is shown. Various numbers of keys an various shapes may be utilized in accordance with the teachings herein. The keys in columns 102, 103 and 104 resemble a standard "12 key" input keypad of a telephone or mobile phone. In FIGS. 1A through 1D, the characters on the phone in columns 102-104 are Japanese "kanji" characters while the keys in columns 101 and 105 represent alternative input functions, modifiers or characters. Reference to specific keys in each column and row will be given a reference to its row and column number. For example, in FIG. 1A, main key 130 is at position 112, 104.

As illustrated in FIG. 1A, a user finger is in contact with main key 130 illustrated by the dashed lines 131. A main key is any of the keys shown in the touch interface 918 in FIG. 1A in columns 101-105. Main keys can be positioned anywhere on the touch interface; for convenience, and usability, the organization shown in FIGS. 1A-1D is well known to users.

Keys in rows 102, 103 and 104, such as key 130, have augmented functionality in accordance with the technology of this user interface. As shown in FIG. 1A, when a user is in contact with key 130, feedback for the user's contact with the key 130 can be provided. Key 130 is shown in a highlighted form, having a distinct color from the other the keys shown in interface 918. Any main key such as key 130 can be highlighted on its own without any supplemental or augmented keys being triggered from the main key 130. Other forms of feedback may be utilized to provide feedback for contact with a main key, supplemental key or modifier key.

Figure 1B:
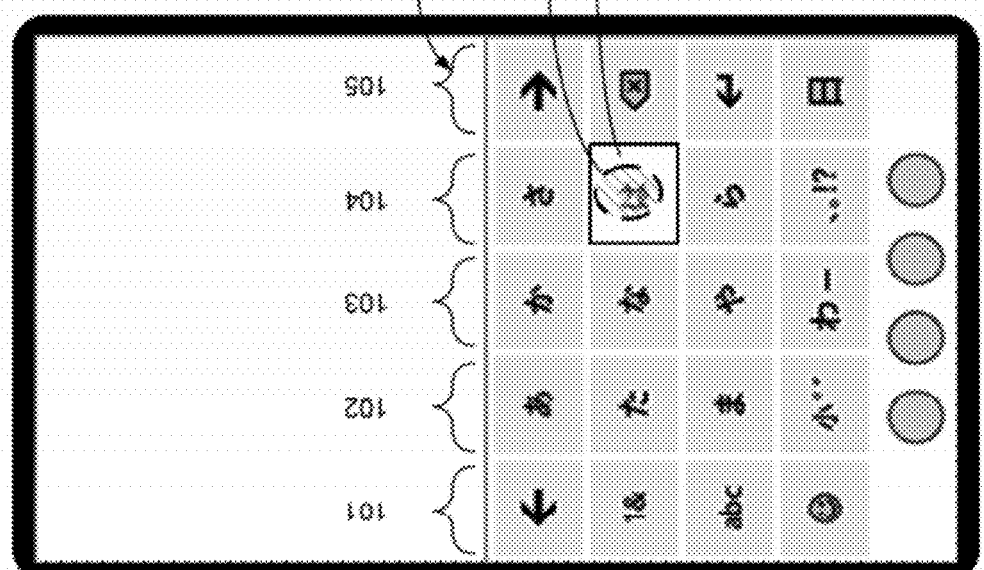
Figure 4:
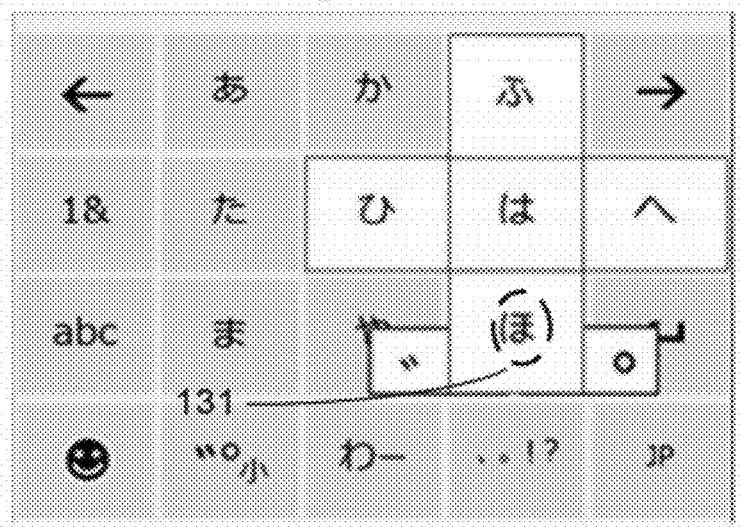
Figure 5:
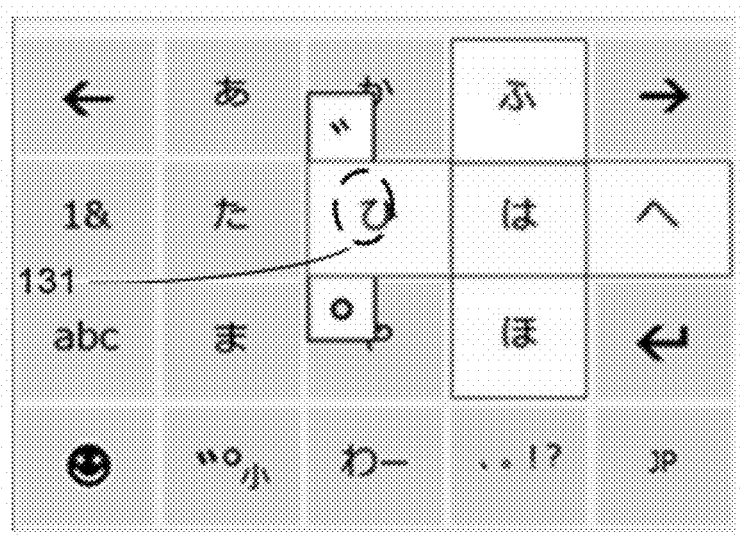

In accordance with the present technology, as illustrated in FIGS. 1B through 1D, an advantage of the present technology is that selection of a main key 130 results in generating one or more petals sub petals (152, 154, 131, 133) from petals (items 132, 134, 136, 138) which are based on the individual main key. As illustrated in FIG. 1B by arrow 160, selection of the main key 130 results in presentation of supplemental keys 132, 134, 136, 138 and from these, generation of modifier or sub-petals 133 and 135. Keys 132, 134, 136 and 138 are termed "petals" an analogy referring to petals from a flower and are positioned adjacent to a main key. Sub-petals 133 and 135 are smaller items which provide additional functionality as described herein and which may emanate from and be adjacent to a main key, or as illustrated in FIGS. 1C and 1D, a supplemental key.

In FIG. 1B, sub petals 133 and 135 have modifier functions associated with them. In FIG. 1*b*, the modifier functions are the Japanese language modifiers of a "dull sound" on key 131 and a half dull sound on key 133. Another modifier which may be used is the small letter modifier which is illustrated in FIG. 1C on sub petal 154 along with the dull sound modifier 152. FIG. 1B illustrates all the variations which may emanate from a main petal 130. These include four petals 132, 134, 136, 138 and two sub petals 133 and 135. Alternatively, as shown in FIG. 1C, some petals may emanate from a petal 155. In FIG. 1C, a user has moved his finger interaction 131 from a main key 150 to a petal 155 by sliding the finger in contact with the keyboard from the main key to the supplemental key 155. This action results in an opening of sub petals 152 and 154 after the user's interaction 131 with the petal 155 is engaged for a sufficient period of time. Petals 154 and 152 spring out as illustrated in FIG. 1D in the directions of arrows 162.

To select a character, the user will touch the particular key. To enter the character or function associated with the key, the user will remove the user's finger from the key. The active removing the user's finger from the key indicates an entry last touched item, whether a character or character as modified by a modifier function. In FIG. 1A if a user touches key 130 and removes a finger, then the character associated with the main key 130 will be entered in the text fields 917. In FIG. 1C, if the user moves his interaction to petal 155 and immediately removes their finger from petal 155 in the position shown in 131, the character associated with the petal 155 will be entered. As illustrated in FIG. 1D if a user moves their finger through petal 155 onto sub petal 152, then the character associated with petal 155 and the modifier associated with sub petal 152 will be entered. It should be understood that any supplemental key (petal) or modifier key (sub petal) may be either characters or modifiers.

FIGS. 2 through 5 illustrate alternative embodiments of petals and sub petals. In FIGS. 1C and 1D, sub-petals 154 and 152 are illustrated as emanating diagonally from a main petal 155. In FIGS. 2-5, sub-petals 180 and 182 fly out horizontally from supplemental key 178.

It should be recognized that upon engaging a main key such as main key 130, any one of a number of petals and sub petals may be activated. As illustrated in FIG. 1A, no sub petals are activated when key 130 is engaged.

Figure 6A:
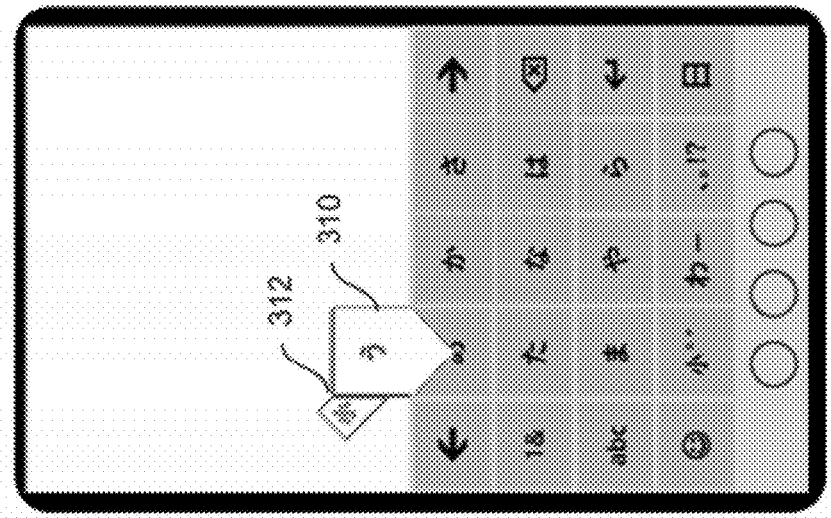
FIGS. 6a-6c illustrate alternative highlighting of in the interface of the present technology.
Figure 6B:
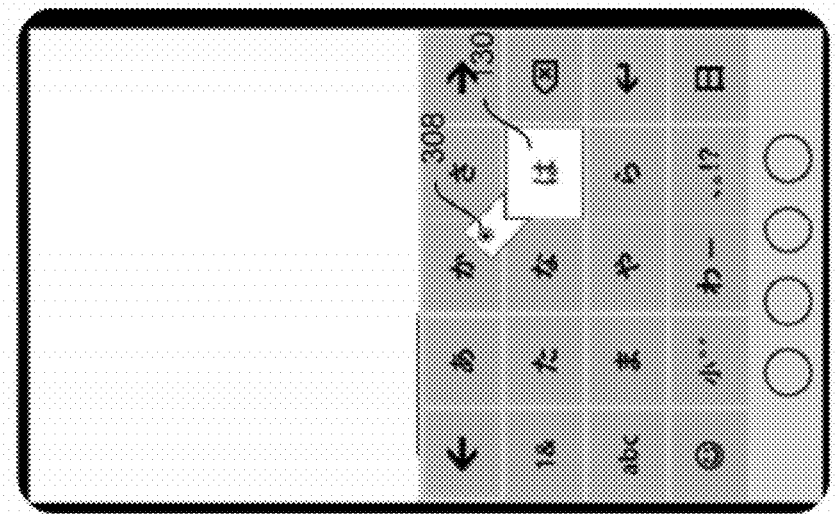
Figure 6C:
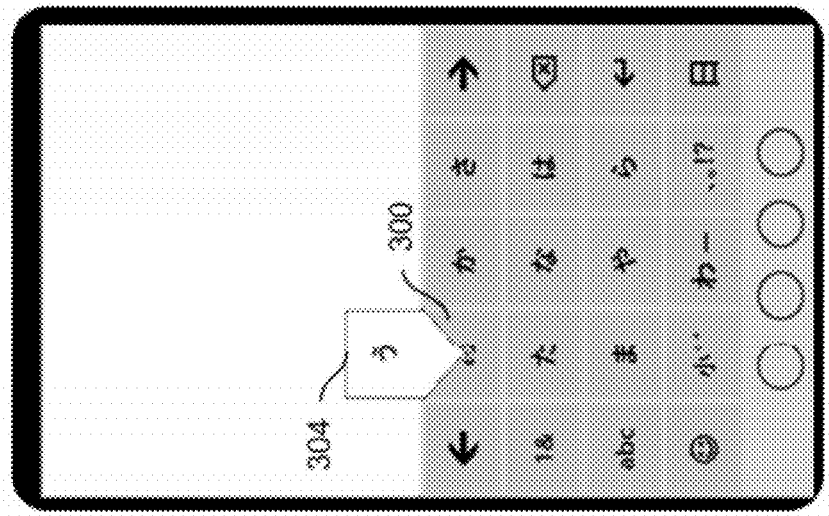

FIGS. 6A-6C illustrate feedback presented when a user moves their finger in interaction with the interface very quickly. As illustrated in FIG. 6A, when a user moves quickly from key 300 in the direction of key 304, only one petal 304 is displayed. As shown in FIG. 6B, when a user move quickly from key 130 diagonally, sub petal 308 emanates from main key 130 allowing showing the one modifier to be chosen with respect to the main key. Similarly, in FIG. 6C, when a user moves from key 300 though key 310 to modifier 312, only one modifier 312 and associated petal 310 are shown. Any number of variations on the type of petals and sub petals utilized in the user interface can be utilized in accordance with the present technology.

Figure 7:
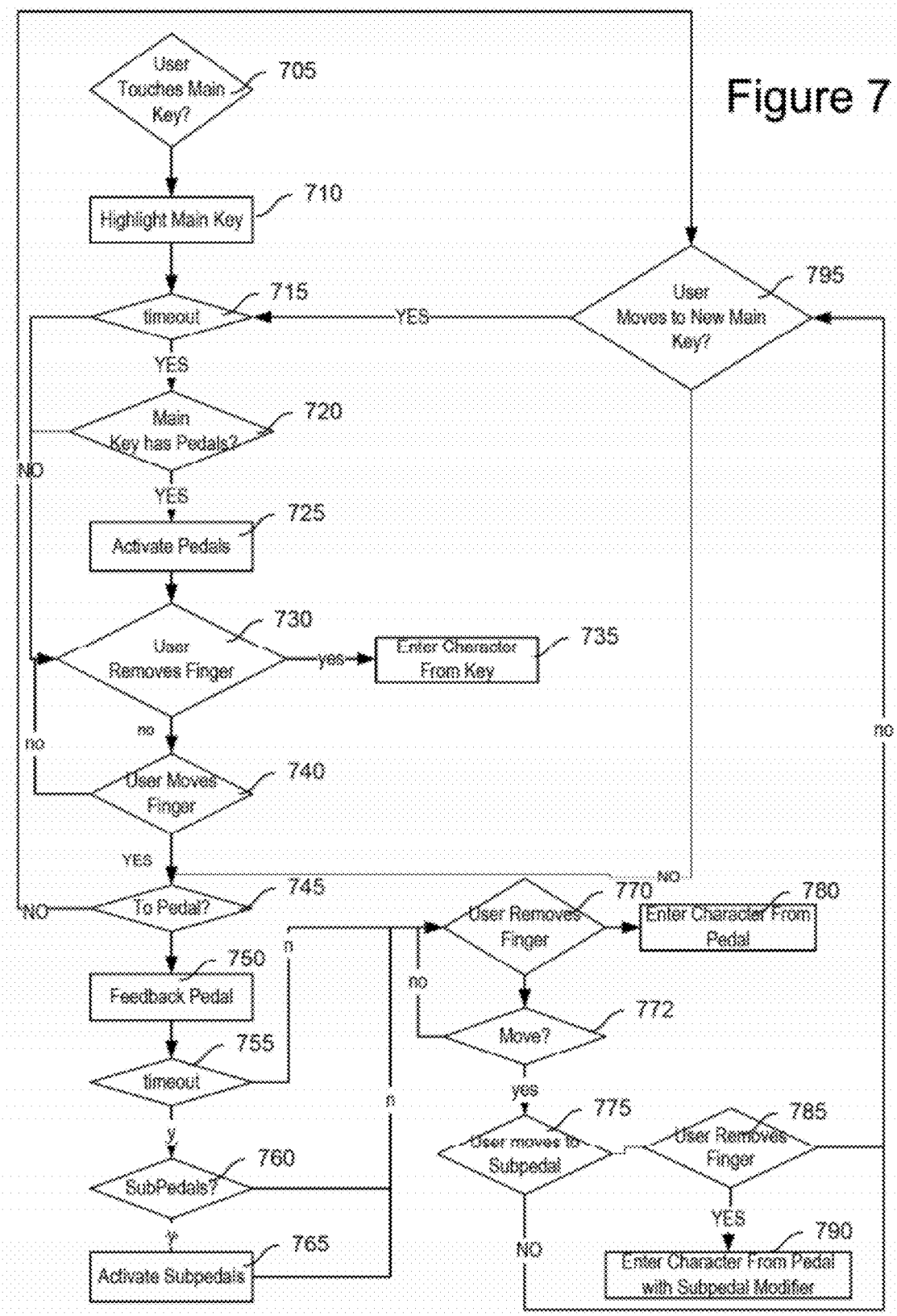
FIG. 7 is a flowchart illustrating a method for presenting the user interface of the present technology.

FIG. 7 illustrates a method in accordance with the present technology for presenting the user interface and allowing a user to select character entry based on their interaction with the interface 918. At 705, a determination is made as to whether or not the user has actually engaged a main key on the display. The main key can be any of the keys illustrated in columns 101 through 105. At 710, once a user has touched a main key, feedback for the user's touching the main key is provided at 710. As illustrated herein, feedback is the highlighting of the main key in a different color. It should be recognized that the feedback can take any number of different forms. Feedback can be provided via different coloring of the key, other highlighting of the key, sound, vibration, or highlighting of the character on the key.

Once a user touches a main key, a time out 715 begins to run before any petals or sub petals, if they exist, are displayed. In one embodiment, the timeout is extremely short—on the order of a few hundred microseconds. The timeout can be varied based on the experience and responsiveness desired of the interface for the user. If the user removes their finger at 730 before the time out occurs, then at 735 the character from the last key engaged by the user is entered in the text screen 917. If the time out completes at 715, a determination is made at 720 as to whether or not the main key has supplemental keys (petals) to display. As noted above, in one embodiment, petals are only displayed for keys in columns 102, 103 and 104 of the interface shown in FIG. 1A. If a user is engaging one of the keys in columns 101 or 105, alternative actions may be engaged at 735 when the user removes their finger at 730. If petals do exist then at 725 the petals are displayed.

The petals displayed in association with a particular main key are customized for that key and dependent upon the character associated with the main key and can change based on the keyboard in use. In addition, because entry of a key comprises a user removing their finger (or other input device) from the screen, the supplemental key is positioned adjacent to the main key so the user can slide to the supplemental key (or modifier key) without removing their finger from the interface touch screen.

At 730, if the user does not remove their finger, a determination is made as to whether or not the user will have moved his finger at 740. If the user has not moved his finger, the user will either remove the finger resulting in entry of the key, or the system will wait to see if the user does in fact move his finger at 740. If the user does move his finger, a determination is made as to whether or not the user has moved his finger to a petal at 745. Movement of the user's finger will either be to a petal associated with the main key, or to a new main key at 795. Movement of the user's finger from a main key to an alternative main key at 795 is illustrated in FIG. 8 where a user's finger 131 can move from main key 148 to one of two alternative main keys 168 or 169. In this case, the associated petals with main key 148 are not interacted with.

If the user does move their finger to a petal at 745, then feedback for movement of the user's finger to a petal is provided at 750. The feedback provided for the petal can be any of the different types of feedback provided above with respect to a main key, including, for example, highlighting the petal when the user places the finger in contact with the screen associated with the petal. At 755, a time out begins to run as to determine whether or not the finger of the user will be removed at 770 or whether sub petals should be displayed at 760 and 765. If sub petals, such as sub petals 152 and 154, associated with main key 155 are in fact present for the particular petal, and the time out has occurred at 755, then sub petals will be displayed at 765. Again, timeout 755 may be very short—on the order of tens or a few hundred microseconds.

At 770, the system waits for the user to remove his finger in order to enter the character or function associated with the sub petal. If the user removes his finger from the petal (having been placed at the petal at 750,) then the character action associated with the petal is entered at 780. If the user has not removed his finger at 770, then a determination is made as to whether or not the user has moved their finger at 772. If the user has moved their finger at 772, then a determination is made as to whether the move is to a sub petal at 755 and if so, then a determination is made as to whether or not the user has removed his finger at 785 or has moved to a new main key at 795. Once the user removes his finger from the sub petal at 785, the character or action associated with the sub petal is entered at 790. Note that at any point throughout the process if the user moves his finger to a new main key at 795 the detection process begins again at 715 or 745. The process is repeated for each interaction with the user interface and cycles back to step 705 once an entry is made at 735, 780 or 790.

Also as illustrated in FIG. 9, if the user does not remove their finger from a petal at 770, movement to a sub petal at 775 can comprise moving to a new sub petal associated with the same main key FIGS. 10 through 14 illustrate how a determination is made as to whether or not a user has moved into a particular petal or sub petal based on the location of a main key. As noted above, the petals of the flower show up when a main key supporting the petals is pressed by a user. In this case, pressed indicates the area within a particular grid which marks the location of a key being depressed.

FIG. 10 illustrates a 3×3 grid 1000 with main key area 1010 marking the location of the main key, and a circle 1020 marking the touch point of a user's interaction with the main key area 1010. From the center point 1030 of main key area 1010, the remaining eight touch-sensitive petal areas (1 through 8 in FIG. 11) are defined by 45 degree wedges based on central point 1030. FIGS. 10 through 13 illustrate the base definition of each petal as being approximately 45 degrees. As discussed below, these wedges 1 through 8 can be modified in accordance with the technology discussed herein.

As noted above, a character is entered when a user releases his finger on the petal. No character is entered when a user slides as illustrated in FIG. 12 from the main key 1010 to a secondary key 1050. If the user releases a finger within the main key then the character assigned to the original key will be entered. If the user slides his finger outside of the screen, the flower gesture will be determined with the petal where the gesture went out of the screen from. If the user slides and release to the petal which has no character assigned, then the character is cancelled. The center of the angle is always the center of the key regardless of where the user touches.

As illustrated in FIG. 10, the user is not touching the center of the key, but the wedges are calculated from the center of the key. Diagonal petals such as 5, 6, 7 and 8 illustrated in FIGS. 10 through 13, are replaced with a sub petal if a modifier exists for the main key. When a user releases a finger at the petal, the petal may persist for some period of time (such as 150 milliseconds) before it disappears. Even after selecting one of the petals (for example 1, 2, 3 or 4 shown in FIGS. 10 through 13), the user can move to a different sub petal as illustrated in FIG. 9.

Figures 13, 14:
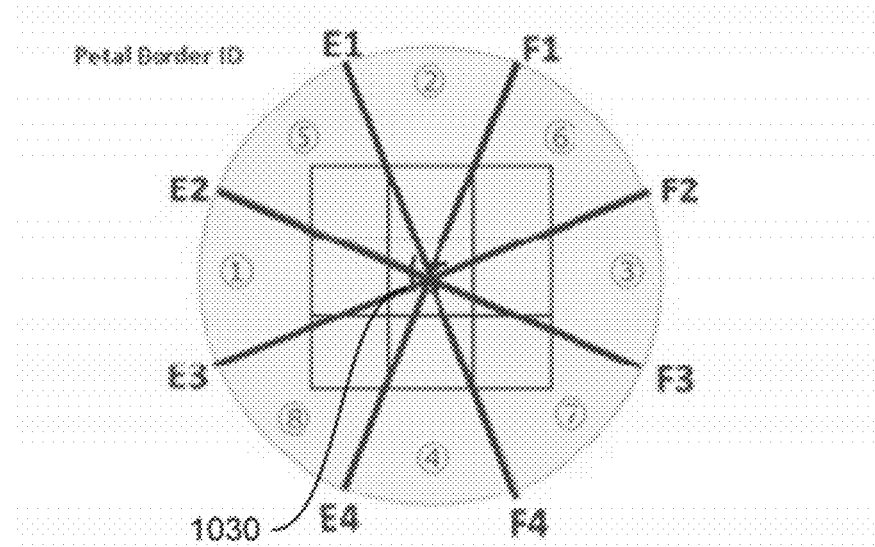
FIGS. 13 and 14 illustrate the relationship between various segments and corresponding key in a standard 12 key input format and are used in understanding the chart illustrated in FIG. 15.

As illustrated in FIGS. 13 and 14, the angle of each petal may be tuned depending on where the key is positioned on the keypad. FIG. 14 illustrates the 12 different key positions within rows 102 through 104 shown in FIG. 1. In one embodiment, tuning is provided for right and left thumb and right and left forefinger gestures.

Tuning may be accomplished by moving the respective petal boundary +x or −x degrees (counterclockwise for E1 through E4 of FIG. 13 and clockwise for F1 through F4 of FIG. 13) relative to the border E1 through E4, F1 through F4 between each petal. For example, a +5 degree shift for the petal border ID of petal 3 would move the border between petal 2 and petal 6 to 5 degrees clockwise, increasing the angle for petal 2 to 50 degrees, rather than 45 degrees. In one embodiment, keys along the top row (1, 2 and 3) and those along the bottom row (10, 11 and 12) have a larger effective area of certain petals based on the studies of user gestures entering characters into the 12 key format discussed above.

Figure 15:
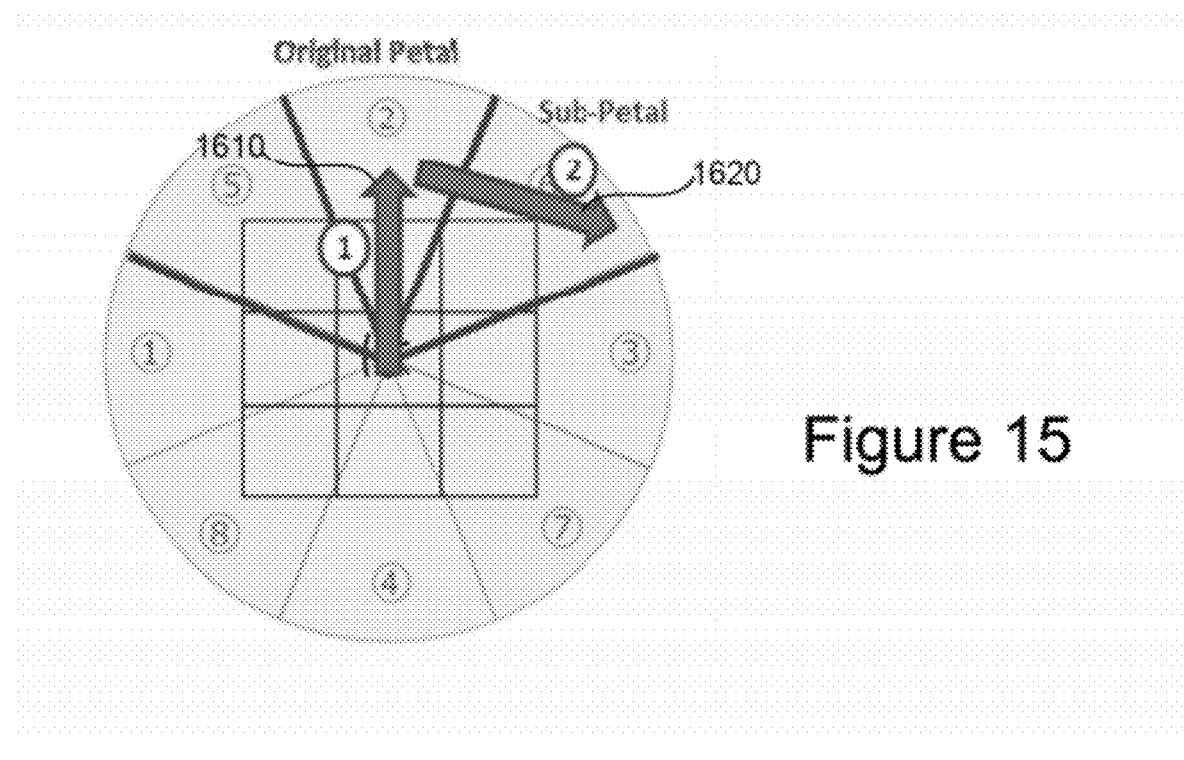
FIGS. 15 and 16 illustrate potential movements made by a user in selecting a sub petal in accordance with the present technology.
Figure 16:
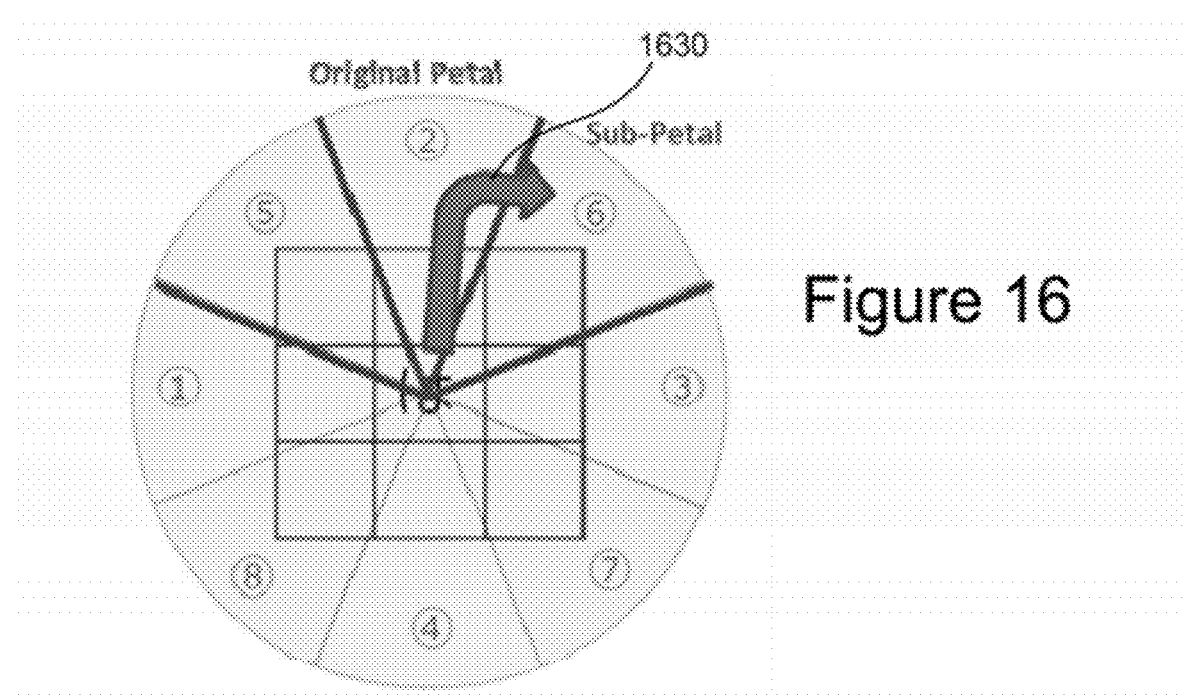

As illustrated in FIGS. 15 and 16, a user may make two different motions for entering a modifier gesture in relation to a main key. FIG. 15 illustrates a two-stroke motion where a user slides from main key 1010 along a first path 1610 into petal 2, stops, and then moves along path 1620 into sub petal 6. Alternatively, the user can make a curved motion 1630 from the main key 1010 into sub petal 6. Both of these motions are detected and supported for entry by the user interface.

Figure 17A:
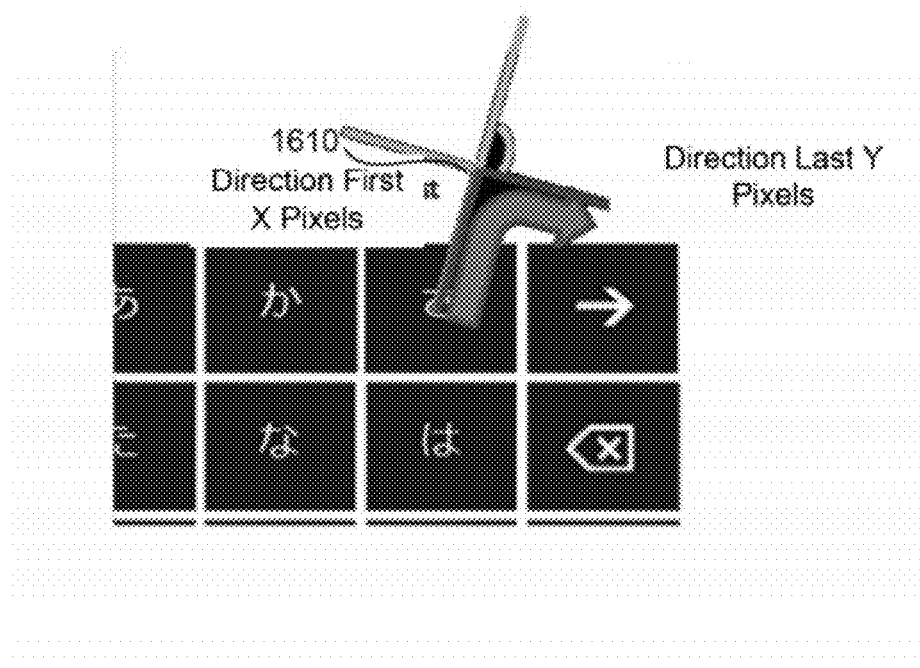
FIGS. 17A and 17B illustrate the method of computing a user's movement in accordance with the present technology.
Figure 17B:
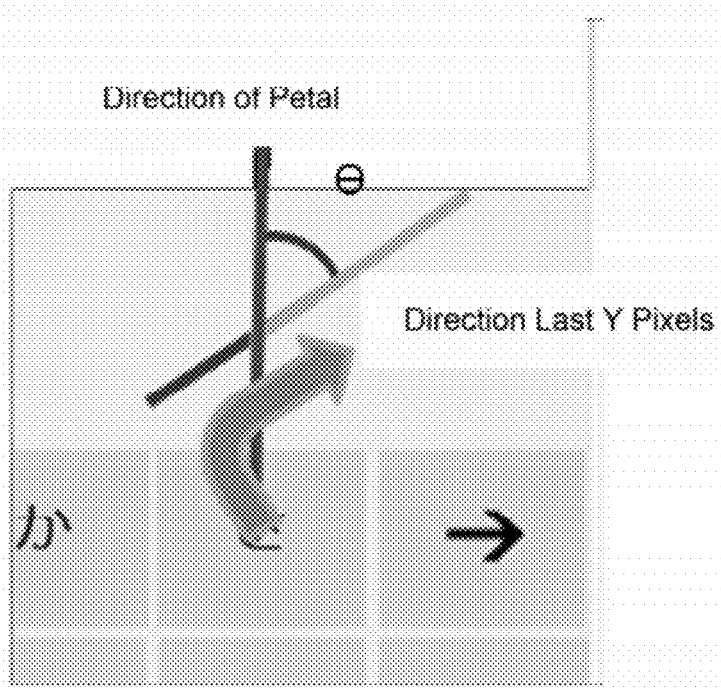
Figure 18A:
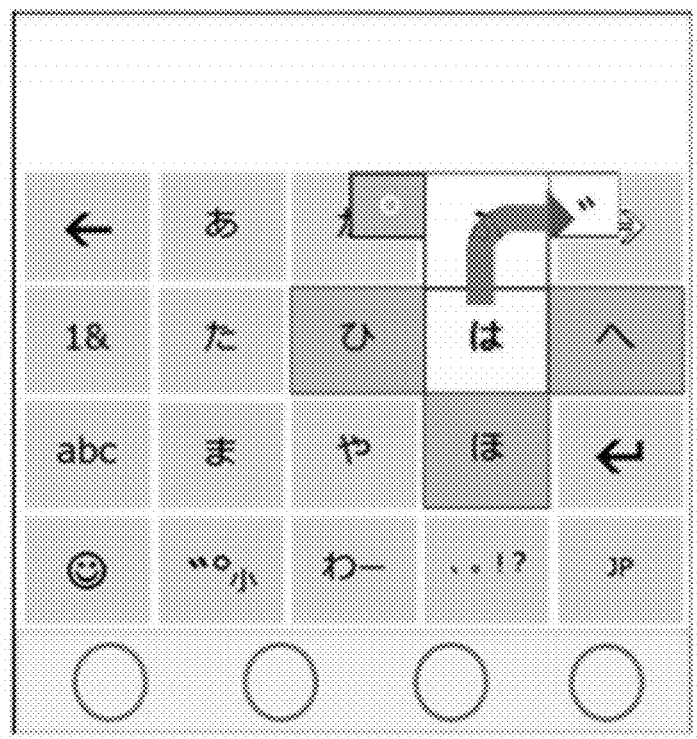
FIGS. 18A through 18D illustrate a user's movement relative to various types of petals and sub petals that can be presented by the user interface.
Figure 18B:
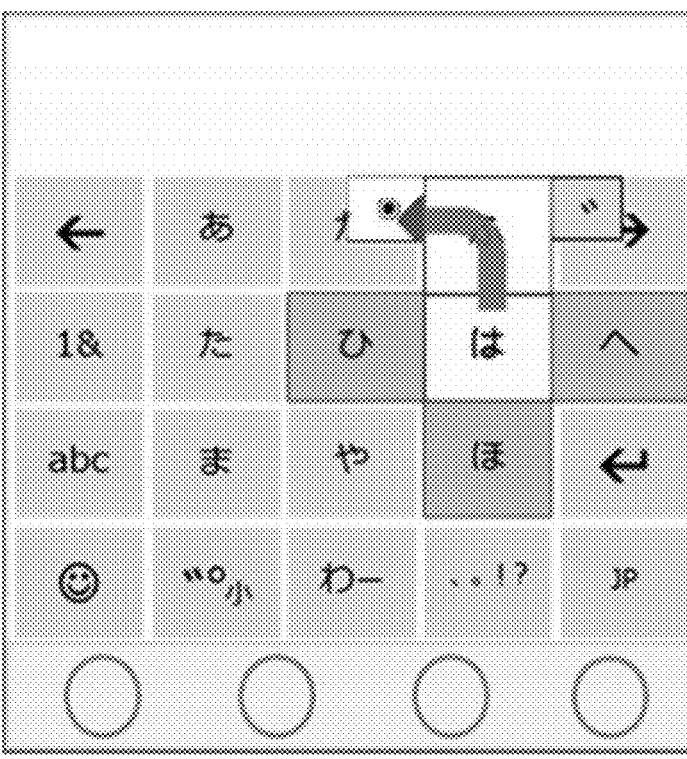
Figure 18C:
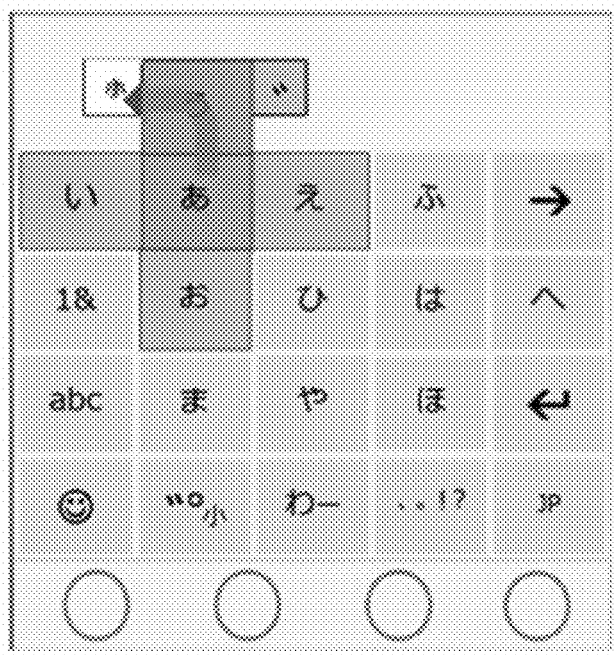
Figure 18D:
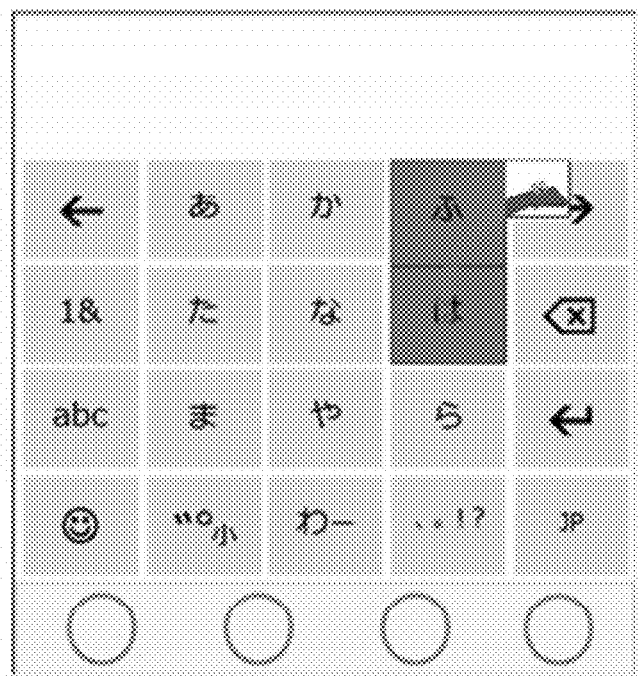

FIGS. 17A and 17B illustrate calculation of a curved angle gesture. Calculation of the direction of a first move 1610 and either a curve at 1630 or a second gesture at 1620. A curved flick is when a gesture is started with the direction of petals 1, 2, 3 or 4 and then is curved for more than a threshold angle. The threshold angle is shown in FIG. 17B as angle theta. If there is no character assigned to the curved flick, then the gesture will be cancelled. To calculate the first set of motion, the direction or bearing some length of a first movement of the gesture is used. A calculation is performed dynamically during the gesture and is followed by a calculation the second movement of the gesture which is defined by an angle between the gesture start and gesture end. It should be noted that the parameters for the first and second bearings in terms of the number of pixels or amount of motion needed to register the direction can be varied in accordance with the present technology. If the gesture curves or crosses the direction of the petal, on can use the direction of the petal, instead of the direction of the length as the gesture starts.

FIGS. 18A through 18D illustrate various curved gestures in relation to selecting modifiers in accordance with different petals and sub-petals. A "tolerance zone" is provided in the diagonal flick petal (petals 5, 6, 7 or 8) where the gesture can transition into a curved flick. The tolerance zone is 15 degrees of angle on both ends of the diagonal petals.

Figure 19:
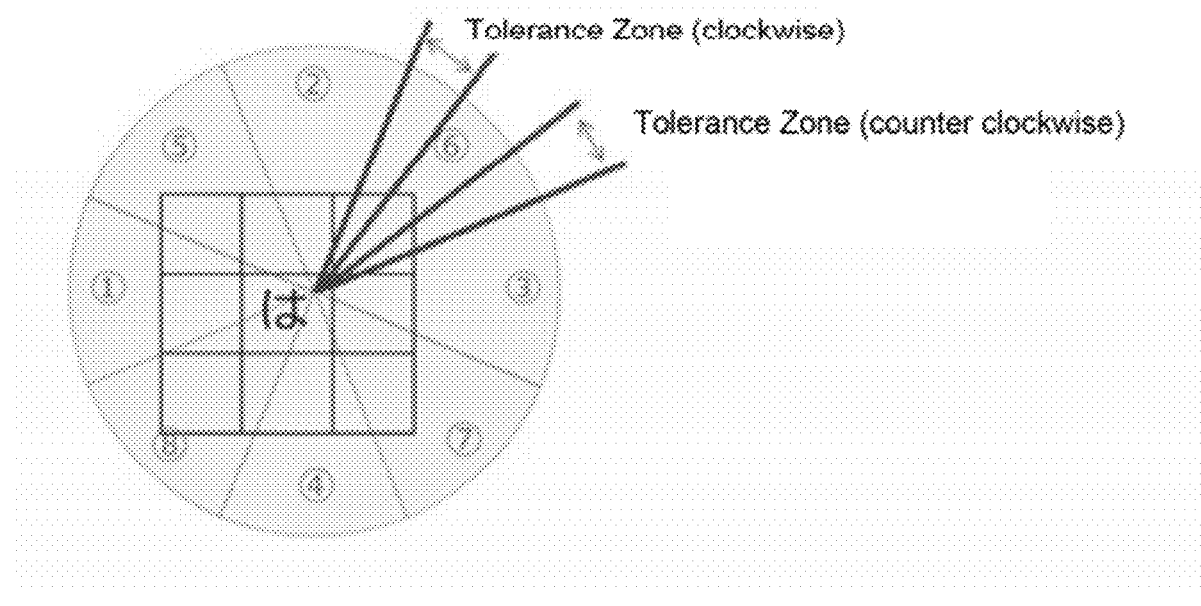
FIG. 19 illustrates the various sub regions and the use of a tolerance zone relative to user movements in accordance with the present technology.
Figure 20:
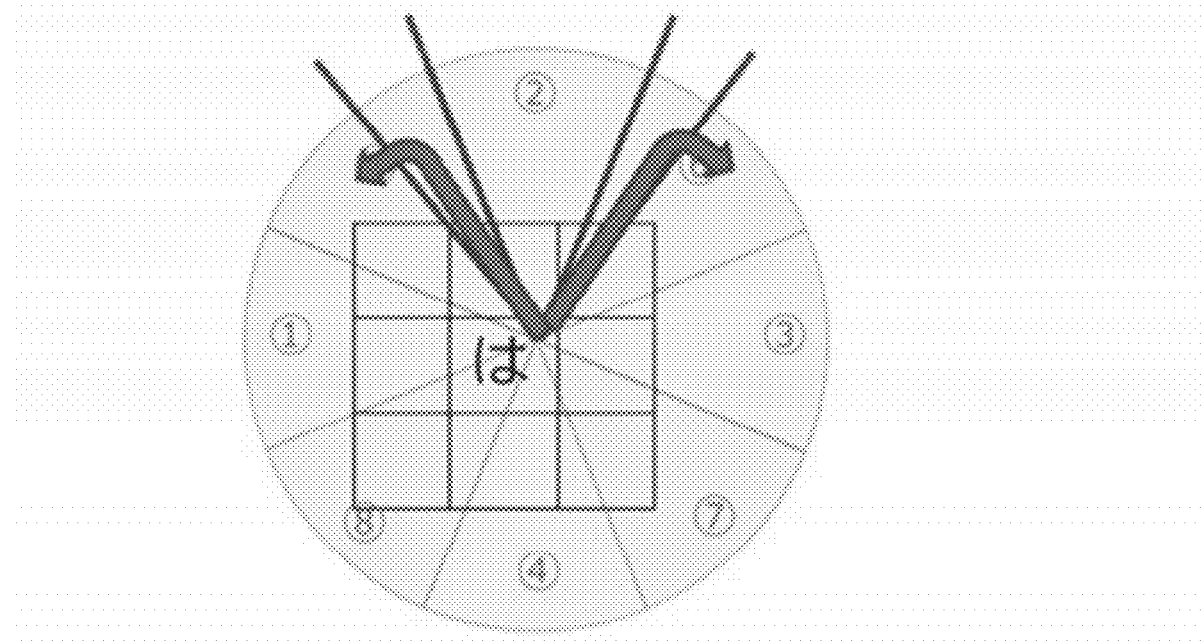
FIGS. 20 and 21 illustrates potential user movements within the tolerance zone and how the movements are interpreted within the tolerance zone.
Figure 21:
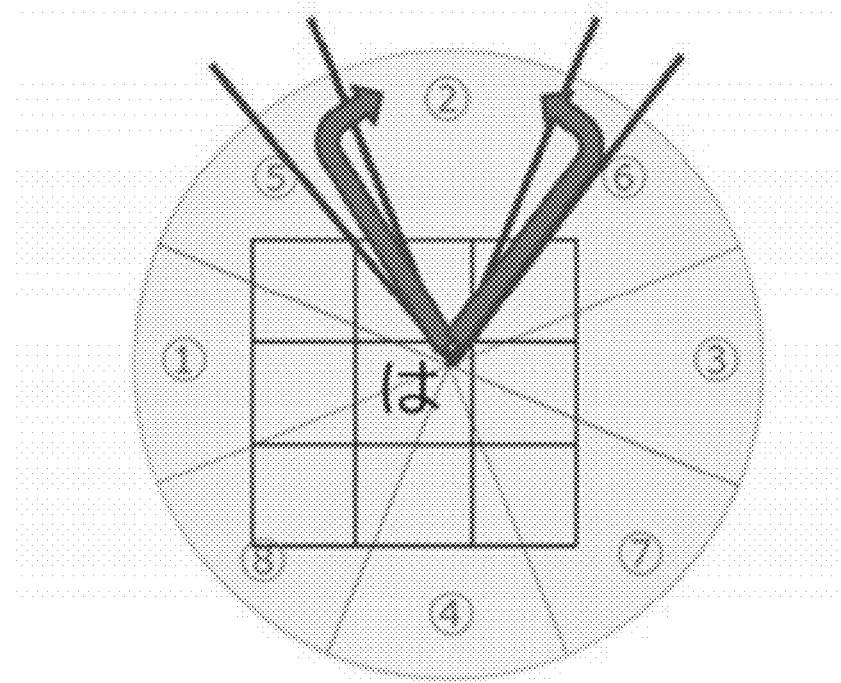

Every diagonal petal has a "tolerance zone" as illustrated in FIG. 19. If the flick gesture falls into the tolerance zone and curves inside as illustrated in FIG. 20 for more than the threshold angle then the gesture will be determined as a flick. If the gesture did not curve more than the threshold angle then the gesture will be determined as a diagonal flick. As illustrated in FIG. 20, the gesture within the tolerance zone curves to a diagonal flick of petals 5 or 6. As illustrated in FIG. 21, the gesture will be identified as a flick to petal 2 rather than to the diagonal petals 5 or 6. The threshold angle is tuned depending on where the key is positioned and which direction the flick is going or curving. Again, tuning is performed for the right or left thumb and right or left forefinger gestures.

Figure 22:
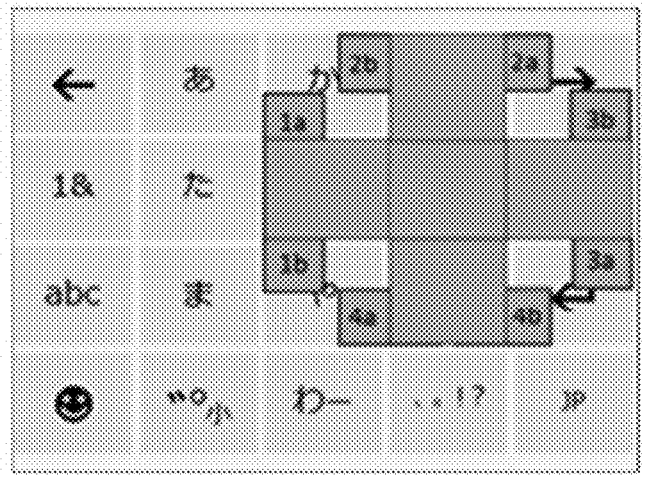
FIG. 22 is a presentation of the user interface and the eight possible sub petals.

FIG. 22 shows the direction ID as sub petals 1A through 4B. In one embodiment, the threshold angle associated with each sub petal may be modified for each sub-petal and based on its location within the 12 key array. Likewise, the length of the gesture and used for calculating the curved angle can be adjusted.

When a user curve flicks to a finger sub petal, the petal and sub petal will be shown in visual feedback. The visual feedback is designed to be shown even before the user releases their finger. If the gesture is recognized as a curve flick, then the visual feedback is provided immediately.

Figure 23A:
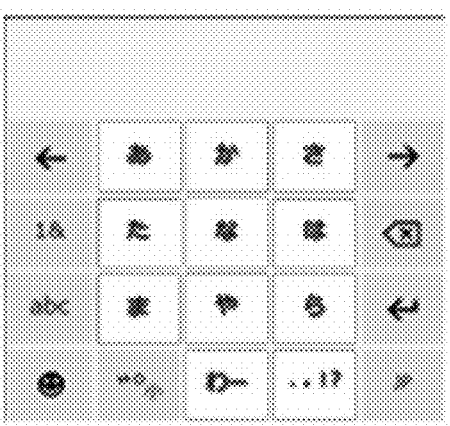
FIGS. 23A through 23C show various alternative keypad input structures which may be utilized in accordance with present technology.
Figure 23B:
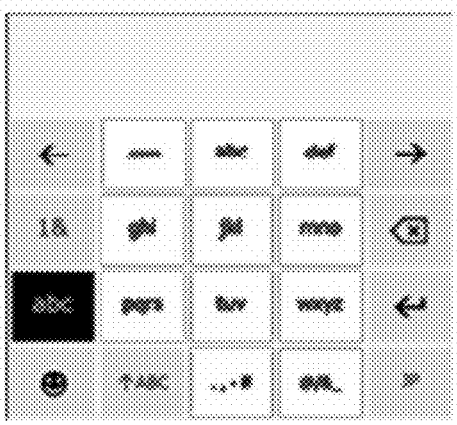
Figure 23C:
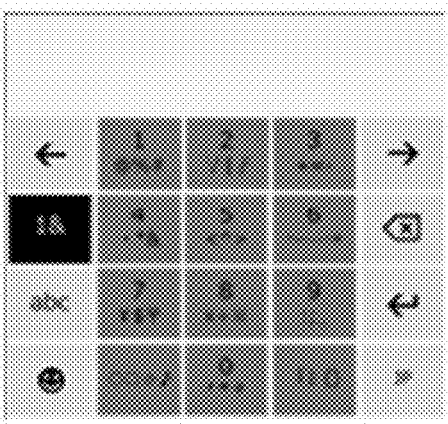

FIGS. 23A through 22C show various character assignments which can be attributed to each of the separate main keys. In each configuration, a main key may have one or more alternative supplemental and modifier keys. For a Japanese character layout of FIG. 23A, Table 1 below shows the supplemental and modifier keys:

TABLE 1

| Key | Petal ID | | | | | | | |
|---|---|---|---|---|---|---|---|---|
| | 1 | 2 | 3 | 4 | 5 | 6 | 7 | 8 |
| .com | .jp | .co.jp | .ne.jp | - | - | - | .com | .com |
| abc | b | c | - | - | - | - | a | a |
| def | e | f | - | - | - | - | d | d |
| ghi | h | i | - | - | - | - | g | g |
| jkl | k | l | - | - | - | - | j | j |
| mno | n | o | - | - | - | - | m | m |
| pqrs | q | r | s | - | - | - | p | p |
| tuv | u | v | - | - | - | - | t | t |
| wxyz | x | y | z | - | - | - | w | w |
| .,-# | , | - | # | - | . | . | . | . |
| @/&_ | / | & | _ | - | @ | @ | @ | @ |

For the Alphanumeric layout, Table 2 below shows the supplemental and modifier keys:

TABLE 2

| Key | Petal ID | | | | | | | |
|---|---|---|---|---|---|---|---|---|
| | 1 | 2 | 3 | 4 | 5 | 6 | 7 | 8 |
| 1 | @ | % | # | - | - | - | 1 | 1 |
| 2 | \ | \| | / | - | - | - | 2 | 2 |
| 3 | + | = | - | - | - | - | 3 | 3 |
| 4 | • | * | & | - | - | - | 4 | 4 |
| 5 | < | ^ | > | - | - | - | 5 | 5 |
| 6 | ~ | ... | → | - | - | - | 6 | 6 |
| 7 | ¥ | $ | 〒 | - | - | - | 7 | 7 |
| 8 | × | ÷ | ※ | - | - | - | 8 | 8 |
| 9 | : | ; | _ | - | - | - | 9 | 9 |
| 0 | ' | " | ° | - | 0 | 0 | 0 | 0 |
| 「」() | 」 | ( | ) | - | 「 | 「 | 「 | 「 |
| .,☆♪ | , | ☆ | ♪ | - | . | . | . | . |

For the numeric layout, Table 3 below shows the supplemental and modifier keys:

TABLE 3

| Key | Petal ID | | | | | | | |
|---|---|---|---|---|---|---|---|---|
| | 1 | 2 | 3 | 4 | 5 | 6 | 7 | 8 |
| 1 | @ | % | # | - | - | - | 1 | 1 |
| 2 | \ | \| | / | - | - | - | 2 | 2 |
| 3 | + | = | - | - | - | - | 3 | 3 |
| 4 | • | * | & | - | - | - | 4 | 4 |
| 5 | < | ^ | > | - | - | - | 5 | 5 |
| 6 | ~ | ... | → | - | - | - | 6 | 6 |
| 7 | ¥ | $ | 〒 | - | - | - | 7 | 7 |
| 8 | × | ÷ | ※ | - | - | - | 8 | 8 |
| 9 | : | ; | _ | - | - | - | 9 | 9 |
| 0 | ' | " | ° | - | 0 | 0 | 0 | 0 |
| 「」() | 」 | ( | ) | - | 「 | 「 | 「 | 「 |
| .,☆♪ | , | ☆ | ♪ | - | . | . | . | . |

Tables 4, 5 and 6, below, specify the characters assigned to the modifier keys (as specified in FIG. 22):

TABLE 4

Layout:

| Key | Sub-Petal ID | | | | | | | |
|---|---|---|---|---|---|---|---|---|
| | 1a | 1b | 2a | 2b | 3a | 3b | 4a | 4b |
| あかさたなはまやらわ。!? | いぎじぢにびみやらを。 | いきしちにひみやりを。 | うぐずづぬぶむゆるん！ | うくすつぬぶむゆるん！ | えげぜでねべめれ—？ | えけせてねべめれ—？ | おごぞどのぼもよろわ゛ | おこそとのぼもよろわ゛ |

TABLE 5

Alphabet Layout:

| Key | Sub-Petal ID | | | | | | | |
|---|---|---|---|---|---|---|---|---|
| | 1a | 1b | 2a | 2b | 3a | 3b | 4a | 4b |
| .com | .jp | .jp | .co.jp | .co.jp | .ne.jp | .ne.jp | .com | .com |
| abc | b | b | c | c | a | - | a | a |
| def | e | e | f | f | d | - | d | d |
| ghi | h | h | i | i | g | - | g | g |

TABLE 5-continued

Alphabet Layout:

| Key | Sub-Petal ID | | | | | | | |
|---|---|---|---|---|---|---|---|---|
| | 1a | 1b | 2a | 2b | 3a | 3b | 4a | 4b |
| jkl | k | k | l | l | j | - | j | j |
| mno | n | n | o | o | m | - | m | m |
| pqrs | q | q | r | r | s | s | p | p |
| tuv | u | u | v | v | t | - | t | t |
| wxyz | x | x | y | y | z | z | w | w |
| .,-# | , | , | - | - | # | # | . | . |
| @/&_ | / | / | & | & | _ | _ | @ | @ |

TABLE 6

Number Layout:

| Key | Sub-Petal ID | | | | | | | |
|---|---|---|---|---|---|---|---|---|
| | 1a | 1b | 2a | 2b | 3a | 3b | 4a | 4b |
| 1 | @ | @ | % | % | # | # | 1 | 1 |
| 2 | \ | \ | \| | \| | / | / | 2 | 2 |
| 3 | + | + | = | = | - | - | 3 | 3 |
| 4 | • | • | * | * | & | & | 4 | 4 |
| 5 | < | < | ^ | ^ | > | > | 5 | 5 |
| 6 | ~ | ~ | ... | ... | → | → | 6 | 6 |
| 7 | ¥ | ¥ | $ | $ | ₸ | ₸ | 7 | 7 |
| 8 | × | × | ÷ | ÷ | ✕ | ✕ | 8 | 8 |
| 9 | : | : | ; | ; | _ | _ | 9 | 9 |
| 0 | ' | ' | " | " | ° | ° | 0 | 0 |
| []() | ] | ] | ( | ( | ) | ) | [ | [ |
| .,☆♪ | , | , | ☆ | ☆ | ♪ | ♪ | . | . |

FIGS. 24A through 24H illustrate various embodiments for showing different types of petals and sub petals off of a different main key. It should be recognized that the various embodiments illustrated in FIGS. 24A through 24H show various petals and sub petals fully expanded. That is, although every petal and sub petal emanating from a main key is illustrated in the various embodiments, all the petals and sub petals would be shown during the exposition of the different embodiments. For example, in FIG. 24A, main key 2700 illustrates four sub petals emanating therefrom, one sub petal directly related to main key 2700 and four sub petals each coming from one of the petals emanating from main petal 2700. In practice, only the sub petal emanating from main key 2700 and the four petals would be displayed when main key 2700 is selected, and only the sub petal associated with one of the four petals emanating from main key 2700 will be displayed when that petal is selected. This is true for each of the various embodiments shown in FIGS. 24A through 24H.

Figure 25:
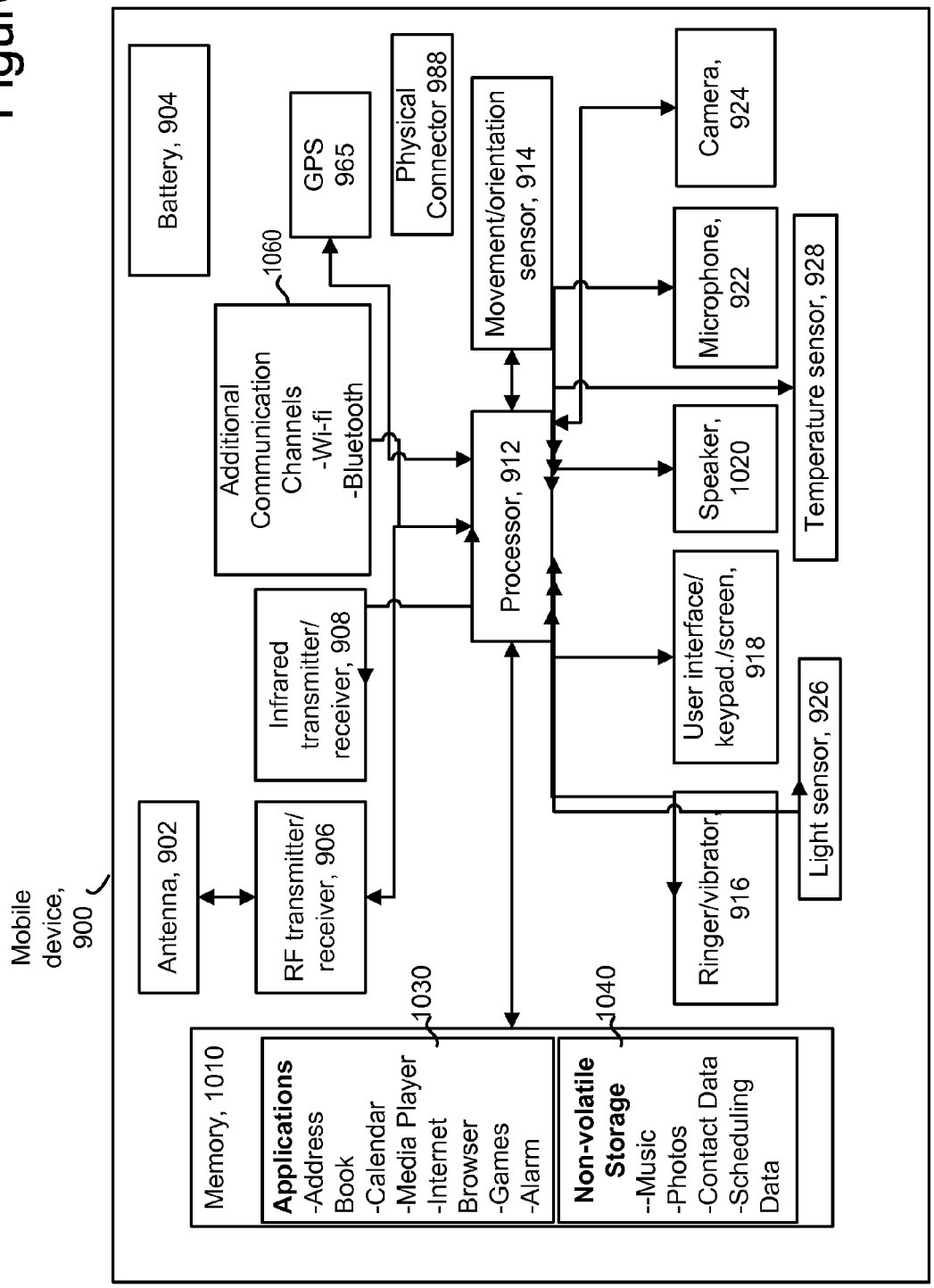
FIG. 25 is a block diagram of hardware suitable for enabling the interface of the present technology.

FIG. 25 illustrates the hardware of a mobile device suitable for implementing the system of the present invention. FIG. 25 is a block diagram of an exemplary mobile device which may operate in embodiments of the technology. Exemplary electronic circuitry of a typical mobile phone is depicted. The phone 900 includes one or more microprocessors 912, and memory 1010 (e.g., non-volatile memory such as ROM and volatile memory such as RAM) which stores processor-readable code which is executed by one or more processors of the control processor 912 to implement the functionality described herein.

Mobile device 900 may include, for example, processors 912, memory 1010 including applications and non-volatile storage. The processor 912 can implement communications, as well as any number of applications, including the interaction applications discussed herein. Memory 1010 can be any variety of memory storage media types, including non-volatile and volatile memory. A device operating system handles the different operations of the mobile device 900 and may contain user interfaces for operations, such as placing and receiving phone calls, text messaging, checking voicemail, and the like. The applications 1030 can be any assortment of programs, such as a camera application for photos and/or videos, an address book, a calendar application, a media player, an internet browser, games, other multimedia applications, an alarm application, other third party applications, the interaction application discussed herein, and the like. The non-volatile storage component 1040 in memory 1010 contains data such as web caches, music, photos, contact data, scheduling data, and other files.

The processor 912 also communicates with RF transmit/receive circuitry 906 which in turn is coupled to an antenna 902, with an infrared transmitted/receiver 908, with any additional communication channels 1060 like Wi-Fi or Bluetooth, and with a movement/orientation sensor 914 such as an accelerometer. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. The processor 912 further communicates with a ringer/vibrator 916, a user interface keypad/screen 918, a speaker 1020, a microphone 922, a camera 924, a light sensor 926 and a temperature sensor 928. As noted above, the interface/keypad screen may comprise a touch sensitive interface reacting to user input from an input device which may comprise the user's finger.

The processor 912 controls transmission and reception of wireless signals. During a transmission mode, the processor 912 provides a voice signal from microphone 922, or other data signal, to the RF transmit/receive circuitry 906. The transmit/receive circuitry 906 transmits the signal to a remote station (e.g., a fixed station, operator, other cellular phones, etc.) for communication through the antenna 902. The ringer/vibrator 916 is used to signal an incoming call, text message, calendar reminder, alarm clock reminder, or other notification to the user. During a receiving mode, the transmit/receive circuitry 906 receives a voice or other data signal from a remote station through the antenna 902. A received voice signal is provided to the speaker 1020 while other received data signals are also processed appropriately.

Additionally, a physical connector 988 can be used to connect the mobile device 900 to an external power source, such as an AC adapter or powered docking station. The physical connector 988 can also be used as a data connection to a computing device. The data connection allows for operations such as synchronizing mobile device data with the computing data on another device.

A GPS transceiver 965 utilizing satellite-based radio navigation to relay the position of the user applications is enabled for such service.

The example computer systems illustrated in the figures include examples of computer readable storage media. Computer readable storage media are also processor readable storage media. Such media may include volatile and nonvolatile, removable and non-removable media implemented in any method or technology for storage of information such as computer readable instructions, data structures, program modules or other data. Computer storage media includes, but is not limited to, RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other medium which can be used to store the desired information and which can accessed by a computer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of providing an interactive graphical user interface on a display comprising:
displaying a plurality of main keys on an touch sensitive input surface of the display, each main key having a defined area in the display and responsive to user input from a touch input device, each main key having one or more adjacent main keys and having at least one character associated with each main key;
upon receiving selection of a main key via a touch input without removal of the touch input from the defined area of the main key, simultaneously displaying a previously un-displayed supplemental key with the main key in a supplemental key area next to the defined area of the main key, the supplemental key having associated therewith one of a supplemental character and a character modifier; and
upon detecting the touch input on the supplemental key area via the touch input without removal of the touch input therefrom, simultaneously displaying a previously un-displayed modifier key associated with the supplemental key along with the supplemental key and the main key associated with the supplemental key, the modifier key displayed in a modifier key area of the display connected to the supplemental key area, the modifier key area being different than the supplemental key area.

2. The method of claim 1 wherein the input device is a user finger, and the user selection comprises a user placing the user finger on the input device.

3. The method of claim 1 wherein an entry of the main key enters the character associated with the main key, and wherein
upon receiving a touch input to one of the plurality of main character input keys followed by a removal of the touch input, entering the at least one character associated with the main key;
upon detecting movement of the touch input from the main key to the supplemental key associated with the main key and removal of the user touch input from the supplemental key, entering the one of the supplemental character or the character modifier; and
receiving a user selection of a modifier key by detecting the touch input is in contact with the modifier key area being removed.

4. The method of claim 1 wherein a character is a Kanji character.

5. The method of claim 4 wherein the modifier key comprises one or more of a dull, half dull and small case modifier.

6. The method of claim 1 wherein the method includes displaying a plurality of supplemental keys in one or more areas connected to the area in which the main key to which the supplemental keys are associated is displayed upon selection of an area in which the main key to which the supplemental keys are associated is displayed.

7. The method of claim 6 wherein the method includes displaying a plurality of modifier keys in areas connected to one or more of the areas in which one of the supplemental keys is displayed.

8. The method of claim 1 wherein selection of a supplemental key and a modifier key includes selection of a main key and a slide from the main key to the supplemental or modifier key while the user input is in contact with the surface.

9. In a computer system having a graphical user interface including a display, a user interface selection device and a user input, a method of providing character entry, comprising;
displaying a plurality of main keys on a touch sensitive surface, each main key occupying a main key area on the touch sensitive surface and being responsive to user input from the touch sensitive surface and having a character associated therewith;
upon receiving selection of a main key via a touch input to the main key area without removal of the touch input from the main key area, displaying in the display one of a plurality of previously un-displayed supplemental keys with the selected main key, the displaying simultaneously with the main key, each supplemental key being displayed in a supplemental key area for said each supplemental key, each supplemental key area connected to the selected main key area, the supplemental key having associated therewith one of a supplemental character and a character modifier;
upon detecting touch input on one of the plurality of supplemental keys without removal of the touch input therefrom, displaying in the display at least one previously un-displayed modifier key associated with the one of the plurality of supplemental keys simultaneously in the display with the supplemental key and the main key, the at least one modifier key displayed in a modifier key area connected to the supplemental key area; and
upon receiving a user entry of the modifier key, entering the modified character in a text entry field.

10. The method of claim 9 wherein the touch input comprises a user placing a finger on the touch sensitive surface in the area in which the key is displayed.

11. The method of claim 10 wherein an entry of the main key enters a character associated with the main key and an entry in the supplemental key area enters a supplemental character.

12. The method of claim 11 wherein said entry of one of the main key, supplemental key or modifier key comprises a user removing their finger from the entry of one of the main key, supplemental key, or modifier key.

13. The method of claim 11 further including:
receiving a user entry of a main key by the user removing the user input after the input is in contact with the area in which the main key is displayed;
receiving a user selection of a supplemental key by the user removing the user input after the input is in contact with the area in which the supplemental key is displayed; and
receiving a user selection of a modifier key by the user removing the user input after the input is in contact with the area in which the modifier key is displayed.

14. The method of claim 13 wherein a character is a Kanji character.

15. The method of claim 14 wherein the modifier key comprises one or more of a dull, half dull and small case modifier.

16. The method of claim 15 wherein selection of a supplemental key and a modifier key includes selection of a main key and a slide from the main key to the supplemental or modifier key while the user input is in contact with the surface.

17. A mobile device comprising:
a touch sensitive display providing a text display area and a character input area;
a mobile network interface;
a memory;
a processor coupled to the text display area and the character input area, the memory including code instructing the processor to provide a user interface on the display, the character input area including:
a plurality of main keys on the touch sensitive display, each main key representing a character and responsive to user input in a main key area from the touch sensitive display, each main key having a plurality of supplemental actions, each of the plurality of supplemental actions having an associated supplemental key, at least one supplemental key having an associated modifier and a modifier key associated with the modifier, the supplemental key adapted for display in a supplemental key area connected to the main key, the modifier key adapted for display in a modifier key area connected to a supplemental key or a main key;
the processor further including code to:
receive a selection to display a supplemental key by receiving a touch input to the main key area without removal of the touch input from the main key area, the selection causing display of the previously un-displayed supplemental key simultaneously with the main key in the supplemental key area connected to the main key area, the previously un-displayed supplemental key having associated therewith one of a supplemental character and a character modifier;
receive a selection of the supplemental key by receiving a touch input to the supplemental key area without removal of the touch input from the supplemental key area, the selection causing a simultaneous display of the modifier key in a modifier key area with the supplemental key displayed in the supplemental key area and the main key in the main key area, all in the display;
receive a selection of one of the main key, supplemental key, and modifier key by removing touch input from a respective key area; and
upon receiving the selection, entering the modified character in the text entry field.

18. The device of claim 17 wherein the device further includes code instructing the processor to:
receive an entry of the main key which enters the character associated with the main key, receive an entry of the supplemental key enters a supplemental character associated with the supplemental key, and wherein
said entry of one of the main key, supplemental key or modifier key comprises a user removing their finger from the entry of one of the main key, supplemental key, or modifier key.

19. The device of claim 18 further including code instructing the processor to vary an area defined for the main key based on a position of the main key in the display.

20. The device of claim 17 wherein selection of a supplemental key and a modifier key includes selection of a main key and a slide from the main key to the supplemental or modifier key while the user input is in contact with the display.

\* \* \* \* \*